Aug. 10, 1954
M. W. WUESTHOFF
2,686,035
SILENT FLOW BALL COCK
Filed Aug. 3, 1950
Fig. 1.
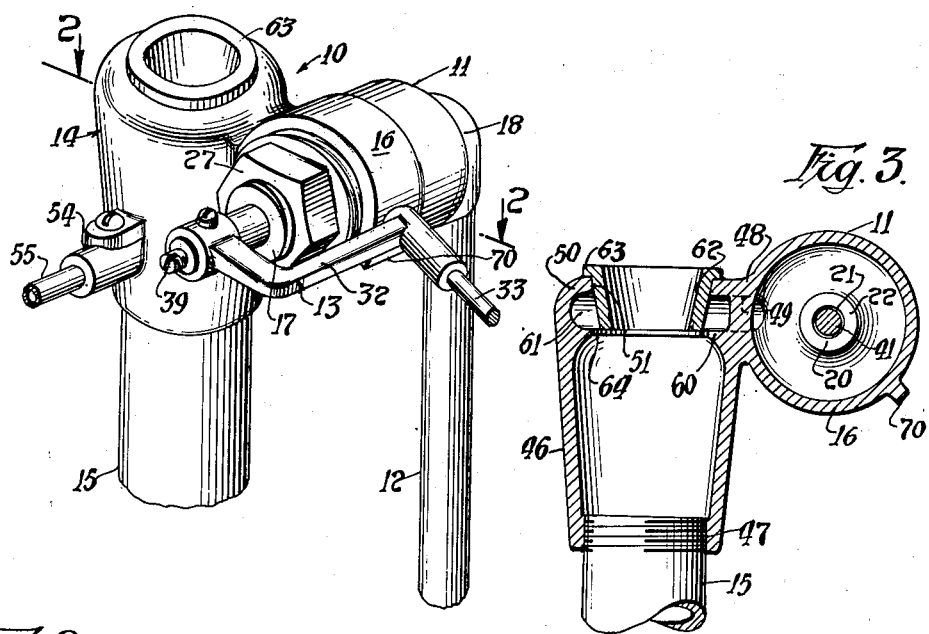
Fig. 3.
Fig. 2.
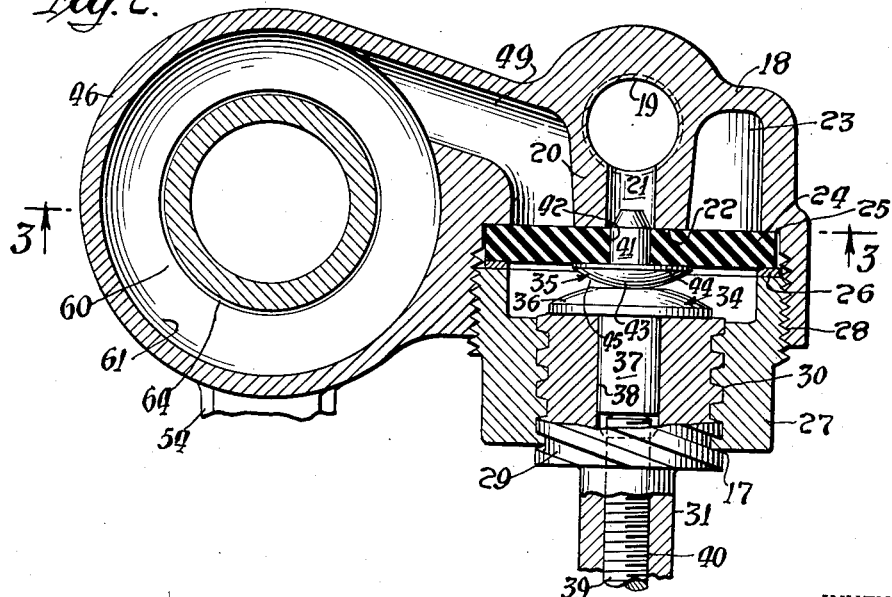
INVENTOR.
Maximilian W. Wuesthoff,
BY
H. Calvin White
Attorney.

Patented Aug. 10, 1954

2,686,035

UNITED STATES PATENT OFFICE 2,686,035

SILENT FLOW BALL COCK

Maximilian W. Wuesthoff, Los Angeles, Calif.

Application August 3, 1950, Serial No. 177,358

2 Claims. (Cl. 251—277)

This invention relates to improved ball cocks or float actuated valve units particularly adapted for use as flush tank valves. Certain features of the invention have been shown in my prior application Serial Number 85,305 filed April 4, 1949, now Patent No. 2,582,616, dated January 16, 1952, of which the present application is a continuation in part.

The special conditions under which flush tank valves must operate introduce into their design several problems not met in most other types of valves. In the first place, a valve to be used for this purpose must be capable of very positive and reliable operation by the necessarily limited force exerted by a float, and must be adapted for such operation over a relatively long active life. Secondly, ordinances in most cities now require that all flush tank valves be specially designed to prevent back siphoning of water from the tank and into the water supply system in the event the supply pressure fails or is shut off. In the third place, it is important that a flush valve unit operate as silently as possible and that the water be directed in a manner to flow quietly through the valve and into the tank.

An important object of the present invention is to provide an improved ball cock assembly having all of the above features desirable in a flush tank valve. Particularly contemplated is a unit satisfying the above requirements and in addition characterized by extreme structural compactness and simplicity and consequent low cost of manufacture. In this connection, I consider highly important the employment of a unique form of valve body so constructed as to serve the multiple purposes of mounting the flow controlling valve mechanism for most effective and positive operation, preventing back siphoning of water from the tank and into the supply line, and silencing the discharge of water into the tank. Structurally, I prefer to employ a screw type valve rotatable about and movable axially along a horizontal axis and discharging into a vertically extending discharge passage laterally offset from the horizontal axis of the valve.

In the preferred form of the invention, the valve body includes an inlet portion having a horizontally extending tubular wall within which the valve mechanism, preferably of the above mentioned screw type, is mounted for horizontal movement, and having a tubular discharge portion extending vertically at a side of the inlet portion and at a location laterally offset from its axis. I prevent back siphoning of water from the tank and into the supply line by providing an anti-siphon air vent at the upper end of the discharge portion of the body through which air may enter the body to break any siphoning vacuum that may develop. To attain a most compact overall body construction, I prefer to so form the body that its two tubular inlet and discharge portions are substantially tangent each to the other at their points of attachment.

Certain highly important features of the invention involve the unique construction of the discharge portion of the body, or in certain instances a separate discharge unit, in a manner assuring substantially silent discharge of the water downwardly into the flush tank. Specifically, I control the water most effectively by providing in the wall of the tubular discharge portion of the body an annular distribution chamber into which water is directed to be discharged downwardly within the body in the form of an annular stream. In this connection, I find it particularly important that the water be discharged from this annular chamber through an annular passage which is relatively restricted as compared with the annular chamber itself. The water may then flow freely about the circular extent of the annular chamber for uniform distribution to all points and then be relatively slowly and silently discharged downwardly through the restricted delivery passage. Uniform circular distribution of the water may be further assured by introducing the water tangentially into the annular distribution chamber. When the water is introduced tangentially, it is contemplated that the water may retain a certain amount of its rotary motion even after discharge through the restricted delivery passage to produce a slow extremely silent spiraling motion as the water flows downwardly through a lower discharge tube into the tank.

Structurally, the discharge unit or discharge portion of the body may comprise a tubular side wall having a bottom discharge opening and an upper anti-siphon air vent, and carrying near its upper end a pair of annular inwardly extending walls forming between them the annular distribution chamber. An air vent tube may be mounted in the upper one of the walls to depend to a point near the lower wall and form therewith the restricted annular discharge passage. For most effective water delivery, the tubular side wall of the discharge unit may be of relatively large diameter at its upper end and may taper downwardly to a smaller diameter at its point of connection to the depending discharge tube.

I prefer to employ in the present flush valve unit a diaphragm type of valve so formed that its various working parts are at all times protected from contact with the water handled. In this connection, a particular feature of the invention involves certain improvements in the construction of such a diaphragm valve, including for one thing the employment of a novel seating element carried by the diaphragm opposite its point of engagement with the usual annular seat and acting to spread the valve closing force evenly over the entire area of the seat. This seating element may have a stem portion removably received within an opening at the center of the diaphragm and carrying a head at the side of the diaphragm opposite the valve seat. For most effective operation, the outer surface of the head should be convexly and preferably spherically curved to be engaged by a valve actuating element at only its center.

Additional features of the invention involve the provision of a novel rotatable swivel element for transmitting valve closing movement between a screw type valve actuating member and the diaphragm carried seating element in a manner effectively avoiding any tendency to twist the diaphragm. To afford an adjustment of the closed condition of the valve, this swivel element may be axially adjustable relative to the actuating element by an adjusting nut accessible for setting at the outside of the valve body.

The above and other features and objects of the present invention will be better understood from the following detailed description of the typical embodiment illustrated in the accompanying drawing in which:

Fig. 1 is a perspective view of a preferred form of flush tank valve unit embodying the invention;

Fig. 2 is an enlarged fragmentary horizontal section through the unit taken on line 2—2 of Fig. 1; and Fig. 3 is a reduced vertical section through the unit taken on line 3—3 of Fig. 2.

The illustrated flush tank ball cock assembly comprises an integral valve body 10 including a first portion 11 mounted to the upper end of a water supply line 12 and containing a screw actuated diaphragm type valve mechanism 13. At the side of portion 11, the body has a tubular second or discharge portion 14 carrying a depending discharge tube 15. The valve body 10 is positioned in the usual manner above the maximum water level in a flush tank with tube 15 extending downwardly to discharge water near the bottom of the tank.

Portion 11 of the body comprises a horizontally extending wall 16 of circular transverse section open at one end 17 and closed by a wall 18 at its opposite end. The central portion of end wall 18 is relatively thick to contain a downwardly opening passage 19 into the lower end of which the water supply line 12 is connected. A circular lug 20 projects from the center of wall 18 at the inside of body portion 11 and contains a central water passage 21 communicating with vertical passage 19. The outer end of lug 20 forms an annular valve seat 22 past which water from inlet passages 19 and 21 flows radially outwardly into an outer annular space 23 about the lug.

Valve mechanism 13 controls the fluid flow past annular seat 22 and includes a circular flexible diaphragm 24 of rubber or the like peripherally clamped against an annular body shoulder 25 lying in the plane of the valve seat. The diaphragm and an adjacent annular washer 26 are clamped against shoulder 25 by an outer cap element 27 which is threaded into the open end of body portion 11 at 28. Cap 27 mounts a valve actuating element 29 by a coarse threaded engagement at 30, to be movable horizontally along the axis of body portion 11 to regulate valve diaphragm 24 in response to rotation about that axis. The outer reduced end 31 of valve actuating element 29 carries an arm 32 mounting an elongated rod 33 to the outer end of which is attached the usual valve controlling float (not shown). The downward movement of arm 32 and the associated float is limited by engagement of the arm with a lug 70 on the body.

Valve actuating element 29 controls the movement of diaphragm 24 through a swivel element 34 and a diaphragm carried seating element 35. Element 34 comprises a head portion 36 extending transversely at the inner end of actuating element 29 and having a stem portion 37 movably received within central bore 38 of the actuating element. The position of swivel element 34 relative to element 29 is adjustable by an adjusting screw 39 threadedly mounted within the actuating element at 40 and projecting outwardly from its outer end for regulation by a screw driver or other tool. Valve seating member 35 has a cylindrical stem portion 41 received within a central opening 42 in the diaphragm and carrying a head portion 43 presenting a transverse shoulder 44 annularly engaging the outer face of the diaphragm opposite seat 22. The outer surface 45 of seating member 35 is substantially spherical to engage an outer flat surface on swivel 34 at substantially a single central point. Seating member 35 is retained in its illustrated position relative to diaphragm 24 by frictional engagement of stem 41 with the diaphragm.

Portion 14 of the valve body comprises a vertically extending downwardly tapering side wall 46 of circular transverse section, to the lower end of which discharge tube 15 is threadedly attached at 47. The two body portions 11 and 14 are positioned in side by side relation and are integrated at a reduced dimension portion 48 located at the upper end of wall 46. It is particularly noted that the circular walls 16 and 46 of the two body portions are substantially tangent each to the other at their point of integration. At its upper end, side wall 46 curves inwardly to form an upper annular generally horizontally extending wall 50 containing a central anti-siphon air vent opening 51. At a location spaced beneath upper wall 50, the body has a second annular horizontal wall or shelf 60 forming with wall 50 an annular liquid delivery chamber 61. Upper wall 50 carries within opening 51 a depending somewhat downwardly tapering anti-siphon tube 62 having a slightly enlarged upper flange 63 brazed or otherwise rigidly secured to wall 50. This tube extends across the inner side of chamber 61 to a location near the inner edge of shelf 60 to form with the shelf an annular downwardly directed liquid delivery passage 64 which is relatively restricted as compared with the chamber 61 itself.

Connecting portion 48 of the body contains an angular passage 49 leading from annular valve discharge space 23 tangentially into annular chamber 61 in portion 14 of the body for delivery through restricted passage 64 into the main inner chamber of the discharge portion of the body. The underside of shelf 60 may curve smoothly outwardly as shown to present a smooth path for the liquid to follow in flowing downwardly from passage 64 and about the shelf. Preferably, the lowest point of the discharge end of passage 49 is exactly horizontally alined with the lower edge of air vent tube 62 (see Fig. 3). Near its lower end, wall 46 of body portion 14 may carry a tubular outlet lug 54 communicating with the bowl refill line 55.

In use, the assembly is installed as a unit in a flush tank with inlet line 12 extending downwardly in the usual manner for connection with a water supply line at the bottom of the tank. Discharge line 15 extends downwardly parallel to inlet line 12 to discharge near the bottom of the tank. As will be understood, when the water level in the tank is low, float carrying arm 33 swings downwardly to rotate valve actuating element 29 in a direction effecting its axial movement outwardly away from the diaphragm to release the diaphragm for movement away from seat 22. Water may then pass outwardly from passage 21 past seat 22 and into annular space 23 for delivery through passage 49 tangentially into annular chamber 61 of body portion 14. The water thus introduced into chamber 61 first spirals inwardly within the chamber and then passes downwardly through restricted gap 64 for delivery downwardly through the body and tube 15 into the tank. A certain amount of the water passing through the body flows into tube 55 to refill the bowl. As the tank fills with water, float carrying arm 33 is elevated and closes the valve upon the attainment of a predetermined water level. Adjusting screw 29 permits regulation of the position of swivel 34 relative to actuating element 29 to regulate exactly the level to which the tank will be automatically filled.

If the valve should at any time be actuated when there is no pressure in water supply line 12, reverse siphoning of water from the flush tank and into the supply line is prevented by the communication of the interior of the valve body with the atmosphere through upper vent tube 62. In other words, any vacuum in line 12 tending to draw water upwardly from the tank through tube 15 is immediately broken by the admission of air into the body through tube 62. Tangential introduction of water into discharge portion 47 of the body distributes the water circularly about the body to assure uniform delivery of water at all points about the annular gap 64. Also, the provision of a relatively large annular distribution chamber 61 discharging through a restricted passage 64 further assures uniform delivery about the passage, while at the same time limiting the rate of discharge so that the operation of the device is substantially silent.

The various walls and passages of the discharge portion of the body may be so proportioned that the water delivered from restricted gap 64 retains a certain amount of its rotary motion to spiral downwardly at the inside of wall 46 and tube 15. This rotary discharging motion may in certain circumstances have the advantage of further silencing the device by minimizing the rate of downward movement of the water and thus preventing the induction of a noise producing stream of air into the body through the air vent.

I claim:

1. A valve comprising a body having a fluid inlet and an outlet communicable therewith, said body containing an annular valve seat past which fluid flows in passing from the inlet to the outlet, a flexible diaphragm mounted in the body and having a central portion movable toward and away from said seat to control the fluid flow therepast, operating means for exerting force against said central portion of the diaphragm at a side opposite the seat to control the seating movement thereof, said diaphragm having a central opening opposite the space within said seat, and a one-piece seating element carried by the central portion of the diaphragm including a head portion annularly engaging the diaphragm opposite said seat to be engaged by said operating means and bearing against said diaphragm directly axially opposite its area of engagement with the seat to thereby distribute the force of said operating means over the seat area, and including a stem portion extending from said head to an outer end of the element and received within said opening in the diaphragm, said seating element being of such a reduced size along said stem and to said outer end of the element that the element is movable into and out of said opening when the parts of the valve are disassembled.

2. A valve comprising a body having a fluid inlet and an outlet communicable therewith, said body containing an annular valve seat past which fluid flows in passing from the inlet to the outlet, a flexible diaphragm mounted in the body and having a central portion movable toward and away from said seat to control the fluid flow therepast, operating means for exerting force against said central portion of the diaphragm at a side opposite the seat to control the seating movement thereof, said diaphragm having a central opening opposite the space within said seat, and a one-piece seating element carried by the central portion of the diaphragm including a head portion annularly engaging the diaphragm opposite said seat to be engaged by said operating means and bearing against said diaphragm directly axially opposite its area of engagement with the seat to thereby distribute the force of said operating means over the seat area, and including a stem portion extending from said head to an outer end of the element and received within said opening in the diaphragm, said head portion of the seating element having an inner annular surface extending transversely of the stem and having an outer convexly curved surface engageable by said operating means at only a central location, said stem being cylindrical and of a transverse dimension corresponding substantially to the diaphragm opening to be frictionally retained therein, said seating element being of such a reduced size along said stem and to said outer end of the element that the element is movable into and out of said opening when the parts of the valve are disassembled.

References Cited in the file of this patent

UNITED STATES PATENTS

| Number | Name | Date |
|---|---|---|
| 1,032,038 | Zimmerman | July 9, 1912 |
| 1,078,943 | Mueller | Nov. 18, 1913 |
| 1,783,281 | Cox | Dec. 2, 1930 |
| 1,969,645 | Glenn | Aug. 7, 1934 |
| 1,999,904 | Helfrich | Apr. 30, 1935 |
| 2,054,909 | Morehouse | Sept. 22, 1936 |
| 2,135,582 | Kohler | Nov. 8, 1938 |
| 2,143,204 | McCormack | Jan. 10, 1939 |
| 2,173,070 | Brown | Sept. 12, 1939 |
| 2,228,552 | Arbogast | Jan. 14, 1941 |
| 2,229,600 | Park | Jan. 21, 1941 |
| 2,252,078 | Kohlmeyer | Aug. 12, 1941 |
| 2,284,051 | Gilbert | May 26, 1942 |
| 2,287,534 | Powers | June 23, 1942 |
| 2,581,043 | Owens | Jan. 1, 1952 |